(12) United States Patent
Gleich et al.

(10) Patent No.: US 11,685,848 B2
(45) Date of Patent: Jun. 27, 2023

(54) BINDER COMPOSITION

(71) Applicant: JOHNS MANVILLE, Denver, CO (US)

(72) Inventors: Klaus Friedrich Gleich, Nuremberg (DE); Philip Francis Miele, Highlands Ranch, CO (US); Michael Ketzer, Collenberg (DE)

(73) Assignee: Johns Manville, Denver, CO (US)

( * ) Notice: Subject to any disclaimer, the term of this patent is extended or adjusted under 35 U.S.C. 154(b) by 184 days.

(21) Appl. No.: 17/153,089

(22) Filed: Jan. 20, 2021

(65) Prior Publication Data
US 2021/0139755 A1    May 13, 2021

Related U.S. Application Data

(60) Continuation of application No. 16/514,759, filed on Jul. 17, 2019, now Pat. No. 10,954,421, which is a division of application No. 15/666,160, filed on Aug. 1, 2017, now Pat. No. 10,407,597, which is a division of application No. 13/496,271, filed as application No. PCT/US2010/050166 on Sep. 24, 2010, now Pat. No. 9,803,116.

(60) Provisional application No. 61/249,916, filed on Oct. 8, 2009.

(51) Int. Cl.
| C09J 161/00 | (2006.01) |
|---|---|
| C08L 23/04 | (2006.01) |
| C08L 23/06 | (2006.01) |
| C08L 23/10 | (2006.01) |
| C08L 23/12 | (2006.01) |
| C09J 161/06 | (2006.01) |
| C09J 161/28 | (2006.01) |
| C08L 23/00 | (2006.01) |
| C08L 75/04 | (2006.01) |

(52) U.S. Cl.
CPC ............ *C09J 161/00* (2013.01); *C08L 23/04* (2013.01); *C08L 23/06* (2013.01); *C08L 23/10* (2013.01); *C08L 23/12* (2013.01); *C09J 161/06* (2013.01); *C09J 161/28* (2013.01); *C08L 23/00* (2013.01); *C08L 75/04* (2013.01); *C08L 2666/06* (2013.01); *C08L 2666/20* (2013.01); *Y10T 428/24149* (2015.01); *Y10T 428/31993* (2015.04); *Y10T 442/20* (2015.04); *Y10T 442/2762* (2015.04); *Y10T 442/2861* (2015.04); *Y10T 442/2975* (2015.04); *Y10T 442/2992* (2015.04)

(58) Field of Classification Search
CPC ..... Y10T 428/24149; Y10T 428/31993; Y10T 442/20; Y10T 442/2762; Y10T 442/2861; Y10T 442/2975; Y10T 442/2992; C08L 23/04; C08L 23/00; C08L 23/10; C08L 23/12

USPC .......... 428/116, 292.1, 297.4, 299.1, 299.7, 428/304.4, 307.3; 442/152, 164, 178, 442/180, 59; 156/324; 427/389.9
See application file for complete search history.

(56) References Cited

U.S. PATENT DOCUMENTS

| 3,271,335 A | 9/1966 | Bostian et al. |
|---|---|---|
| 3,433,701 A | 3/1969 | Armour |
| 3,473,908 A | 10/1969 | Snow |
| 3,473,948 A | 10/1969 | Turner |
| 3,585,149 A | 6/1971 | Vassiliades |
| 3,867,171 A | 2/1975 | Ellsworth |
| 4,073,761 A | 2/1978 | Bowman et al. |
| 4,094,846 A | 6/1978 | DeLapp et al. |
| 4,094,847 A | 6/1978 | Huffman |
| 4,182,788 A | 1/1980 | Vassiliades |
| 5,837,620 A | 11/1998 | Kajander |
| 5,955,203 A | 9/1999 | Briggs et al. |
| 6,316,088 B1 | 11/2001 | Ogawa et al. |
| 10,954,421 B2 * | 3/2021 | Gleich ................ C08L 23/12 |
| 2001/0021448 A1 | 9/2001 | Kajander |
| 2002/0132129 A1 | 9/2002 | Farwaha et al. |
| 2003/0118834 A1 | 6/2003 | Dashiell |
| 2004/0110883 A1 | 6/2004 | Pakan et al. |
| 2006/0217471 A1 | 9/2006 | Shooshtari |
| 2009/0098330 A1 | 4/2009 | Lee et al. |
| 2009/0181252 A1 | 7/2009 | Shooshtari |
| 2009/0305595 A1 | 12/2009 | Ogawa et al. |
| 2010/0167005 A1 | 7/2010 | Ketzer |
| 2010/0221973 A1 | 9/2010 | Ketzer |

FOREIGN PATENT DOCUMENTS

| EP | 2 486 104 B1 | 7/2018 |
|---|---|---|
| GB | 1 317 881 | 5/1973 |
| WO | 2008/101679 A2 | 8/2008 |

OTHER PUBLICATIONS

Courtemanche, Thomas, "The Effect of a B-Stage Phenolic Resin on the Properties of Polypropylene", XP002618041, Annual Technical Conference—Society of Plastics Engineers, 55th (vol. 2), 2480-2482, 1997, ISSN: 0272-5223.
Rue, "Energy-Efficient Glass Melting—The Next Generation Melter", Gas Technology Institute, Project No. 20621 Final Report, 2008.
Sims, Richard, "Batch charging technologies—a review," May 2011, www.glassonweb.com, Nikolaus Sorg Gmbh & Co KG.
"Glass Melting", Battelle PNNL MST Handbook, U.S. Department of Energy, Pacific Northwest Laboratory, retrieved from the Internet Apr. 20, 2012.
"Roll Compaction", brochure from the Fitzpatrick Company, Elmhurst, Illinois, retrieved from the Internet Apr. 20, 2012.

* cited by examiner

*Primary Examiner* — Camie S Thompson
(74) *Attorney, Agent, or Firm* — Robert D. Touslee

(57) ABSTRACT

The invention relates to a new binder composition which is particularly suitable for the manufacture of composite materials utilizing such new binder composition in the required nonwoven materials. Composite materials using such new binder composition in their nonwoven part are suitable, in particular, for composites materials for interior construction, for linings, floor coverings, and for the manufacture of furniture and similar products.

20 Claims, No Drawings

BINDER COMPOSITION

CROSS REFERENCE TO RELATED APPLICATIONS

This application is a continuation of U.S. application Ser. No. 16/514,759, filed Jul. 17, 2019, which application is a divisional of U.S. application Ser. No. 15/666,160, filed Aug. 1, 2017, now U.S. Pat. No. 10,407,597 issued Sep. 10, 2019, which application is a divisional of U.S. application Ser. No. 13/496,271, filed Apr. 6, 2012, now U.S. Pat. No. 9,803,116 issued Oct. 31, 2017, which is the National Stage of International Application No. PCT/US2010/050166, filed Sep. 24, 2010, which claims the benefit of U.S. Provisional Application No. 61/249,916, filed Oct. 8, 2009.

BACKGROUND

The invention relates to a new binder composition which is particularly suitable for the manufacture of composite materials utilizing such new binder composition in the required nonwoven materials. Composite materials using such new binder composition in their nonwoven part are suitable, in particular, for composites materials for interior construction, for linings, floor coverings, and for the manufacture of furniture and similar products.

Composite materials are increasingly replacing traditional building materials as construction materials and must be adapted for manifold applications. Thus, on the one hand a sufficient mechanical stability is required and on the other hand a good workability and low weight are necessary. There has therefore been no lack of attempts to improve existing composite materials.

In particular, the combining of wood materials, which are manufactured from comminuted wood and the use of binders, with further materials is widely used and already known. To this end, the two materials are usually laminated and form a composite material. The selection and combination of the materials can improve the mechanical properties and at the same time a reduction, e.g. of the weight, can be achieved.

Composite materials based on wooden materials and non-woven fabrics strengthened by a so called "B-stage" binder are known from WO2006/031522. The base nonwoven fabrics are known, e.g., from U.S. Pat. Nos. 5,837, 620, 303,207 and 6,331,339. In WO2008/101678 and WO2008/101679 the state of the art technologies relating to wooden laminates comprising reinforcing nonwoven and their manufacturing processes are disclosed.

Even though the known technologies, including the aforementioned literature, provide already very good results in product performance and efficient manufacturing there is still a need for improvements. One of the main deficiencies in respect to existing reinforced wooden laminates is the still limited mechanical strength and stability of these products. In addition, the reinforcing nonwovens exhibit a rather restricting brittleness creating handling problems and dust during the manufacturing process and the subsequent lamination steps. For some applications a more flexible nonwoven product is desired.

It has now been found, that by using a specific binder composition for the reinforcing nonwoven components of such composite materials the aforementioned problems can be solved and more flexible and less brittle reinforcing nonwovens reduce the handling problems and dust formation during the manufacturing process and the subsequent lamination steps.

SUMMARY OF THE INVENTION

The present invention relates to a new binder composition comprising (i) at least one B-stage binder and (ii) at least one emulsion, preferably a thermoplastic emulsion, in particular the emulsion being based on polyolefin and/or polyurethane. Preferably, the emulsion is added to the B-stage binder before the binder composition is applied to a textile fabric. The binder composition according to the present invention can be processed under B-stage conditions.

The invention further relates to textile structures which comprise the new binder composition. Such textile structures while being in the B-stage conditions exhibit increased flexibility and improved handling capabilities which is advantageous for the processing, e.g. into laminates. The textile structure is preferably a nonwoven material, a woven fabric or a paper.

The invention further relates to multilayer laminates comprising a textile structure that comprises the new binder composition. These laminates exhibit increased flexibility, improved impact resistance and offer additional advantages during processing. Such composite materials are particularly suitable for interior construction, for linings, floor coverings, and for the manufacture of furniture or similar products.

DETAILED DESCRIPTION OF THE INVENTION

Subject matter of the present invention is a new binder composition comprising (i) at least one B-stage binder and (ii) at least one emulsion, preferably a thermoplastic emulsion, in particular the emulsion is being based on polyolefin and/or polyurethane.

The above binder composition is applied to textile structures which then can be used as semi-finished products for the production of laminates. The binder composition can also be applied during the manufacturing of the textile structure.

The semi-finished products comprising the binder composition and the laminates made thereof are particularly suitable for wooden composite materials.

Binder

The new binder composition contains at least one so called B-stage binder composition. The binder composition comprises such B-stage resin together with at least one emulsion, preferably a thermoplastic emulsion, in particular based upon a polyolefin emulsion, or a polyurethane based emulsion. The binder composition of the present invention can be applied to textile structures which can be used for the manufacturing of composite materials and laminates. The binder composition can be applied during or after the forming of the textile structure. The binder composition is applied to the textile structure and then partly cured to B-stage condition. The textile structure comprising the binder in B-stage condition can then be processed into composites or laminates.

B-stage binders within the meaning of this invention denotes binders that are only partially cured or hardened and can still experience a final hardening, e.g., by thermal post-treatment. Such B-stage binders are exhaustively described in U.S. Pat. Nos. 5,837,620, 6,303,207 and 6,331, 339. The B-stage binders disclosed therein are also subject matter of the present description. B-stage binders are preferably binders based on furfuryl alcohol formaldehyde, phenol formaldehyde, melamine formaldehyde, urea formaldehyde and their mixtures. Preferably, aqueous systems are concerned. Further preferred binder systems are formaldehyde-free binders. B-stage binders are distinguished in that they can be subjected to a multistage hardening, that is, they still have a sufficient binding action after the first hardening or after the first hardenings so that they can be used for the further processing. Such binders are usually hardened after the addition of a catalyst at temperatures of ca. 177° C. (350° F.) in one step.

Preferred B-stage binders are binders based on melamine formaldehyde. Preferably, aqueous systems are concerned. B-stage binders are distinguished in that they can be subjected to a multistage hardening, that is, they still have a sufficient binding action after the first hardening or after the first hardenings so that they can be used for the further processing.

In order to form the B-stage condition, such binders are optionally hardened after the addition of a catalyst. The amount of hardening catalyst is up to 10% by weight, preferably 0.25 to 7% by weight (relative to the total binder content). For example, ammonium nitrate as well as organic aromatic acids, e.g., maleic acid and p-toluene sulfonic acid are suitable as hardening catalysts since they allow the B-stage state to be more rapidly reached. In addition to ammonium nitrate, maleic acid and p-toluene sulfonic acid, all materials are suitable as hardening catalysts that have a comparable acidic function. In order to reach the B-stage the textile structure impregnated with the binder is dried under the influence of temperature without producing a complete hardening. The necessary process parameters are dependent on the binder system selected.

The lower as well as the upper temperature limit can be influenced by the selection of the duration and/or by adding or avoiding rather large or rather strong acidic hardening catalysts and/or by optionally using stabilizers.

Preferably, the new inventive binder composition consists essentially of B-stage binder, as described above, and at least one emulsion, preferably a thermoplastic emulsion, in particular the emulsion is being based on polyolefin and/or polyurethane. The thermoplastic emulsion is chemically different from the B-stage binder. Thermoplastic emulsions are not 3-dimensional crosslinking such as a thermoset and therefore can not be B-staged.

Most preferred the new inventive binder composition consists of one B-stage binder, as described above, and one thermoplastic emulsion, preferably a polyolefin emulsion or a polyurethane based emulsion.

The aforementioned emulsion is added to the preferably aqueous B-stage binder before the application of the binder onto the textile structure.

Preferably the emulsion is a thermoplastic emulsion. Preferably the emulsion is a polypropylene emulsion or a polyurethane based emulsion.

The inventive binder composition contains, beside the B-stage binder, at least 0.1% emulsion, based on the total solid content of the binder composition, up to a value of approximately 35%. The preferred range is between 1% and 10%, the optimum value depending on the binder used.

In general, most of the preferred emulsions are commercially available. Examples are the DSM products NEOXIL Nx777, NEOXIL Nx2728N (polypropylene emulsion) or NEOXIL Nx 6158, NEOXIL Nx5521 (polyurethane emulsion) as well as the Addcomp products Priex 701, Priex 702 or Priex 703 (polypropylene emulsion). Other examples are PVC emulsions or styrene-acrylic emulsions from Lubrizol or PE emulsions from Michelman. Usually such emulsions comprise additional components such as additives, emulsifiers, stabilizers, etc.

As discussed later the addition of emulsion, in particular for emulsion based on polyolefin and/or polyurethane, to the B-stage binder induces surprising effects. Besides a higher flexibility of the textile structure and less brittleness and dust, laminates made with these textile structures exhibit a strongly improved impact resistance when polyolefin emulsions were used as second component. When using polyurethane emulsions similar effects can be observed regarding dust and brittleness.

Textile Structure (Semi-Finished Textile Product)

The invention further relates to semi-finished textile structures which comprise the new binder composition comprising (i) at least one B-stage binder and (ii) at least one emulsion, preferably a thermoplastic emulsion, in particular the emulsion is being based on polyolefin and/or polyurethane, said binder composition is at least partially cured and being in the B-stage state.

Textile structures according to this invention are all textile fabrics manufactured from fibers and from which a textile fabric was produced by means of a surface-forming technology. The inventive binder composition is applied to the textile structure during or after the manufacturing of the textile structure but prior to any subsequent process steps.

Textile Structures

The textile structures to be provided with the new binder composition according to the present invention can basically be used without pre-strengthening binders, in particular chemical binders. However, in order to ensure the required strengths in the further working of the textile structures other additional binders can also be introduced and/or known consolidation/mechanical strengthening methods, such as needling, can be used. In addition to the possibility of a mechanical strengthening, e.g., by calendaring or needling, in particular the hydrodynamic needling is also mentioned here. Chemical and/or thermoplastic binders are suitable as binders, as long they are compatible to the new binder composition according to the present invention.

However, the textile structures to be provided with the new binder composition according to the present invention are preferably pre-strengthened with a chemical binder. The binders used can be the same or different but must be selected from the group of the binder systems compatible with the B-stage binder system according to the present invention. The additional binder component is maximally 40% by weight, preferably 30% by weight or less, based on the total weight of the textile structure without the B-stage binder composition.

The new binder composition according to the present invention can be applied to the textile structure after the textile structure has been formed. When using this so-called off-line process route the additional (pre-strengthening) binder component is preferably 10-30% by weight of the total weight of the textile structure. The B-stage binder composition is 25-85% by weight, preferably 50-80% by weight based on the total weight of the final pre-strengthened textile structure but without any additives. Final in this context means fiber weight plus any pre-strengthened binder plus B-Stage binder, including solids of emulsion after curing (=without moisture content) minus fillers/additives in the B-Stage binder, if any.

The new binder composition according to the present invention can also be applied during the manufacturing of the textile structure. In this so-called in-line process the additional (pre-strengthening) binder component can be zero and can be substituted completely by the B-stage binder composition. The B-stage binder content is 10% to 80%, preferable 15% to 75%, most preferable 15% to 50% of the total weight of the textile structure without any additives or fillers. Such content being only the B-Stage binder and solids from the emulsion but no additives or fillers, if any.

The fiber-forming materials for the textile structures are preferably natural fibers and/or fibers of synthesized or natural polymers, ceramic fibers, mineral fibers or glass fibers that can also be used in the form of mixtures. Textile structures are considered to be tissues, layings, multiaxial fabrics, knitted fabrics, knitwear, woven and non-woven fabrics, preferably woven and non-woven fabrics. Papers, Kraft papers, balance papers, overlay papers, and decor papers are considered textile structures as well.

Mineral- and Ceramic Fibers

The textile structures of mineral- and ceramic fibers are aluminosilicate fibers, ceramic fibers, dolomite fibers, wollastonite fibers or fibers of vulcanites, preferably basalt fibers, diabase fibers and/or melaphyr fibers, especially basalt fibers. Daibases and melaphyrs are designated combined as paleobasalts and diabase is also often designated as greenstone.

The mineral fiber non-woven fabric can be formed from filaments, that is, infinitely long fibers or of staple fibers. The average length of the staple fibers in the non-woven fabric of mineral fibers used in accordance with the invention is between 5 and 120 mm, preferably 10 to 90 mm. In a further embodiment of the invention the mineral fiber non-woven fabric contains a mixture of endless fibers and staple fibers. The average fiber diameter of the mineral fibers is between 5 and 30 µm, preferably between 8 and 24 µm, especially preferably between 8 and 15 µm.

The weight per unit area of the textile structure of mineral fibers is between 15 and 500 g/m$^2$, preferably 40 and 250 g/m$^2$, wherein these data refer to a textile structure without any binders, additives or coatings.

Glass Fibers

In the case of the textile fibers of glass fibers non-woven fabrics are particularly preferred. They are constructed from filaments, that is, infinitely long fibers or of staple fibers. The average length of the staple fibers is between 5 and 120 mm, preferably 10 to 90 mm. In a further embodiment of the invention the glass fiber non-woven fabric contains a mixture of endless fibers and staple fibers.

The average diameter of the glass fibers is between 5 and 30 µm, preferably between 8 and 24 µm, especially preferably between 10 and 21 µm.

In addition to the previously cited diameters so-called glass microfibers can also be used. The preferred average diameter of the glass microfibers is between 0.1 and 5 µm. The microfibers forming the textile surface can also be present in mixtures with other fibers, preferably glass fibers. Moreover, a layer-shaped construction of microfibers and glass fibers is also possible.

The textile structure can also additionally have a reinforcement of fibers, threads or filaments. Reinforcement threads are preferably multi-filaments or rovings based on glass, polyester, carbon or metal. The reinforcement threads can be used as such or also in the form of a textile surface structure, e.g., as fabric, laying, knitted fabric, knitwear or non-woven fabric. The reinforcements preferably consist of a parallel thread sheet or of a laying.

The weight per unit area of the textile structure of glass fibers is between 15 and 500 g/m$^2$, preferably 40 and 250 g/m$^2$, wherein the data refers to a surface structure without any binders, additives or coatings.

Suitable glass fibers comprise—among others—those manufactured from A-glass, C-glass, E-glass, S-glass, T-glass or R-glass.

The textile structure can be manufactured according to any known method. For glass non-woven fabrics this is preferably the dry- or wet laying method.

Polymer Fibers

Among the textile structures of fibers of synthetic polymers, non-woven fabrics, especially so-called spun bonds, that is, spunbonded non-woven fabrics produced by a tangled deposit of melt-spun filaments are preferred. They consist of endless synthetic fibers of melt-spinnable polymer materials. Suitable polymer materials are, e.g., polyamides such as, e.g., polyhexamethylene diadipamide, polycaprolactam, aromatic or partially aromatic polyamides ("aramids"), aliphatic polyamides such as, e.g., nylon, partially aromatic or fully aromatic polyesters, polyphenylene sulfide (PPS), polymers with ether- and keto groups such as, e.g., polyetherketones (PEK) and polyetheretherketone (PEEK), polyolefins such as, e.g., polyethylene or polypropylene, cellulose or polybenzimidazoles. In addition to the previously cited synthetic polymers, those polymers are also suited that are spun from solution.

The spunbonded non-woven fabrics preferably consist of melt-spinnable polyesters. In principle, all known types of polyester material suitable for the manufacture of fibers are considered as polyester material. Polyesters containing at least 95 mole % polyethyleneterephthalate (PET), especially those of unmodified PET, are especially preferable.

If the composite materials in accordance with the invention should additionally have a flame-retardant action, it is advantageous if they were spun from polyesters modified in a flame-retardant manner. Such polyesters modified in a flame-retardant manner are known.

The individual titers of the polyester filaments in the spunbonded non-woven fabric are between 1 and 16 dtex, preferably 2 to 10 dtex.

In a further embodiment of the invention the spunbonded non-woven fabric can also be a bonded fiber fabric hardened by melt binder and which contains carrier fibers and melded fibers. The carrier fibers and melded fibers can be derived from any thermoplastic, fiber-forming polymers. Such spunbonded non-woven fabrics hardened by melt binder are described, e.g., in EP-A-0,446,822 and EP-A-0,590,629.

In addition to endless filaments (spunbond method) the textile surface can also be constructed of staple fibers or mixtures of staple fibers and endless filaments. The individual titers of the staple fibers in the non-woven fabric are between 1 and 16 dtex, preferably 2 to 10 dtex. The staple length is 1 to 100 mm, preferably 2 to 500 mm, especially preferably 2 to 30 mm. The textile surface structure can also be constructed of fibers of different materials in order to be able to achieve special properties.

The textile structure can also additionally have a reinforcement of fibers, threads or filaments. Multi-filaments or rovings based on glass, polyester, carbon or metal are preferred as reinforcement threads. The reinforcement threads can be used as such or also in the form of a textile surface structure, e.g., as fabric, laying, knitted fabric, knitwear or non-woven fabric. The reinforcements preferably consist of a parallel thread sheet or a laying.

The filaments and/or staple fibers constructing the bonded fiber fabric can have a practically round cross-section or also other forms such as dumbbell-shaped, kidney-shaped, triangular or tri- or multi-lobed cross-sections. Hollow fibers and bi- or multi-component fibers can also be used. Furthermore, the melded fibers can also be used in the form of bi-component or multi-component fibers.

The fibers forming the textile structure can be modified by customary additives, e.g., by antistatic agents such as carbon black.

The weight per unit area of the textile structure of fibers of synthetic polymers is between 10 and 500 g/m$^2$, preferably 20 and 250 g/m$^2$, wherein the data refers to a surface structure without any binders, additives or coatings Natural Fibers The natural fibers are vegetable fibers, fibers derived from grasses, straw, wood, bamboo, reed and bast, or fibers of animal origin. Plant fibers is a collective concept and stands for seed fibers such as cotton, kapok or poplar fluff, bast fibers such as bamboo fiber, hemp, jute, linen or ramie, hart fibers such as sisal or manila, or fruit fibers such as coconut. Fibers of animal origin are wools, animal hairs, feathers and silks.

The weight per unit area of the textile structure of natural fibers is between 20 and 500 g/m$^2$, preferably 40 and 250 g/m$^2$, wherein the data refers to a surface structure without any binders, additives or coatings Natural Polymer Fibers The textile surfaces of fibers of natural polymers are cellulose fiber such as viscose or vegetable or animal protein fibers.

Among the textile surfaces of cellulose fibers non-woven fabrics are especially preferred. They are constructed from filaments, that is, infinitely long fibers and/or from staple fibers. The average length of the staple fibers is between 1 and 25 mm, preferably 2 to 5 mm.

The average diameter of the cellulose fibers is between 5 and 50 μm, preferably between 15 and 30 μm.

The textile surface structure can also be Kraft papers, overlay papers, balance papers or decor papers. Such papers are particularly beneficial when used as core papers and/or as surface paper in CPL and HPL.

Binder Application

The new binder composition according to the present invention can be applied to the textile structure after the textile structure has been formed (off-line process). The new binder composition according to the present invention can also be applied during the manufacturing of the textile structure (in-line process). Depending on the process chosen a suitable method for the binder application must be selected.

The application of the new binder composition according to the present invention onto the textile structure can take place with the aid of all known methods. In addition to spraying on, impregnating and pressing in, the binder can also be applied by coating or by rotary nozzle heads. If following the inline process path the B-stage binder composition according to the present invention can also be part of the white water or any other aqueous means used for the production of the textile structure.

A further preferred method is the application of the new binder composition according to the present invention by the application of foam. In the application of foam binder foam is produced with the aid of a foaming agent in a foam mixer that is applied by suitable coating aggregates onto the non-woven fabric. The application can also take place here by rotary nozzle heads.

In the foam coating of a B-stage-capable binder composition there are basically no limitations regarding the foaming agent. Preferred foaming agents are ammonium stearates or succinic acid esters added with 1%-5% by weight in dry mass to the binder. Furthermore, the already described catalysts are mixed in if required. The solids content of the foam is at least 40%, preferably at least 50%.

The total binder content in the textile surface structure is between 10% and 80% based on total weight of the dried surface structure and includes all applied binder components and additives.

Functional Materials

The textile structure or the semi-finished textile structures comprising the new binder composition can contain additives and/or functional materials. The additives and functional material can be applied at the same time with the new binder composition, e.g., as mixture or as individual components, or before or after the application of the binder composition. In as far as the new B-stage binder composition is applied by foam application it is advantageous to apply the functional material with the foam or distributed in the foam or to apply the functional material onto the still fresh foam.

In order to fix the functional materials a binder can be additionally added for fixing the functional materials on the textile structure. The same binder composition is preferably selected here as is present in the textile surface structure. The content of functional material is determined by the subsequent use.

The application of the functional material used takes place as a function of the nature of the particular functional material by known techniques. The application can also take place by rotary nozzle heads.

The functional material is preferably flame proofing agents, materials for discharging electrostatic charges, materials for screening off electromagnetic rays, organic or inorganic pigments, especially colored pigments, materials that increase the resistance to wear and/or slippage, or decorative layers. The functional materials are preferably arranged on the side of the textile surface structure and can at least partially pass through the non-woven fabric.

In a variant of the method an additional binder is added to fix the functional materials on the textile surface structure. The same binder (B-stage binder) as is present in the textile surface structure is preferably selected here. The content of functional materials is determined by the subsequent use.

Flame Proofing Agents

The flame proofing agents are inorganic flame proofing agents, organophosphorus flame proofing agents, nitrogen-based flame proofing agents or intumescences flame proofing agents. Halogenated (brominated and chlorinated) flame proofing agents can also be used but are less preferred on account of their risk evaluation. Examples for such halogenated flame proofing agents are polybrominated diphenylether, e.g., decaBDE, tetrabromobisphenol A and HBCD (hexabromocyclododecane).

The nitrogen-based flame proofing agents are melamines and urea. The organophosphorus flame proofing agents are typically aromatic and alkyl esters of phosphoric acid. TCEP (trischloroethylphosphate), TCCP (trischloropropylphosphate), TDCCP (trisdichloroisopropylphosphate), triphenylphosphate, trioctylphosphate (tris-(2-ethylhexyl)phosphate) are preferably used.

The inorganic flame proofing agents are typically hydroxides such as aluminum hydroxide and magnesium hydroxide, borates such as zinc borate, ammonium compounds such as ammonium sulfate, red phosphorus, antimony oxides such as antimony trioxide and antimony pentoxide and/or laminated silicates such as vermiculite. In addition, preferred agents are expandable graphite.

Antistatic Agents

Antistatic- and electromagnetic screening effects can be achieved by the use of agents for raising the electrical conductivity.

The antistatic agents are usually particles that are electrically conductive. Suitable materials are electrically conductive carbons such as carbon black, graphite and carbon nanotubes (C-nanotubes), conductive plastics or fibers of metal or metallic components.

Electrically Conductive Materials

The materials for screening electromagnetic rays are usually electrically conductive materials. They can be built up in the form of foils, particles, fibers or wires and/or textiles surface structures of the previously cited materials.

Fillers

Fillers are materials such as $CaCO_3$, coated $CaCO_3$, coated or uncoated Kaolin, talcum, gypsum or silica, etc.

Pigments

The inorganic or organic pigments are particulate materials. In addition to fillers such as $CaCO_3$, talcum, gypsum or silica, the pigments, to the extent that they should increase the value of the composite material, are in particular pigments that can be used in colors.

Hydrophobic Agents

Hydrohobic agents are additives which are able to increase or modify the compatibility of the B-stage binder composition to the carrier or the textile structure. Prominent but not limiting examples are fluorine or silane containing components which can greatly improve the compatibility of the binder to metal and glass surfaces.

Surface Coatings

In addition to increasing the value, materials are also used that increase the application suitability. In particular an anti-slippage coating is to be understood here as well as a coating that ensures an increased wear protection. SiC and/or $SiO_2$ particles are preferably used for the anti-slippage coating with a grain size of preferably 2-5 mm. The amount is 1-40%, preferably 10-30% by weight based on the total weight of the textile structure. In order to increase the effectiveness of the coating and to reduce the amount of the coating used the surface can additionally be structured.

Comparable materials are used for the surface enhancement in order to improve the abrasion and hardness. However, grain sizes of below 1 mm are used, which can produce a very hard surface.

In as far as the functional layer should be an anti-slippage coating, it is advantageous if it or the basic particles are present entirely or at least partially worked into the textile surface structure and/or the B-stage binder composition. In particular in the case of an anti-slippage coating and service enhancement in order to improve the abrasion and hardness it is advantageous if the particles are applied on to the textile surface structure in such a manner that the particles project at least partially from the surface of the textile surface structure. The resulting rigidity, in particular for an anti-slippage coating, must meet the appropriate national norms and regulations.

Decorative Elements

The decorative layers are decorative elements. This is understood to include decorative layers and patterns that increase the value of the composite material. Examples of such patterns are veneers, cork, decorative papers, foils with wood graining, overlay papers, HPL, CPL (laminates built up in multilayers) or chips of paper or plastic with different colors that are also designated as decorative semifinished products. For their part, these decorative semifinished products can contain B-stage-capable binders and/or one or more textile surfaces, preferably non-woven or non-woven fabric layers.

Method of Manufacturing the Semi-Finished Textile Structure

Subject matter of the present invention is a method for the manufacture of a semi-finished textile structure comprising the measures:

a) Supplying of a textile structure, whereas the textile structure optionally has received a pre-strengthening, b) Application of at least one binder composition comprising (i) at least one B-stage binder and (ii) at least one emulsion, preferably a thermoplastic emulsion, in particular the emulsion is being based on polyolefin and/or polyurethane, c) Optionally applying at least one functional material to the textile structure according to b), d) Drying the textile structure so that the B-stage binder is at least partially cured and being in the B-stage state.

The textile structure in measure a) has preferred an additional pre-strengthening treatment as already described above. However, it is also possible to apply the binder composition according to the present invention to the textile structure during its formation. In this so-called in-line process measures a) and b) step are carried out simultaneously at the same time during the formation of the textile structure. The inline process does not necessarily require pre-strengthening means if the B-stage binder composition itself can provide sufficient binding strength.

The application of the binder in step b) can be accomplished as described above. Optionally, functional materials can be applied. The functional materials can be applied together with the binder or after the application of the binder. The subsequent drying step removes the water and partially cures the B-stage binder to a B-stage condition.

The temperature and duration of the drying step depends on the materials used, the process, and the planned applications. It is particularly important to set the temperature and drying duration according to the required degree of curing of the B-stage binder composition. In general, the drying parameters to be chosen are similar to those for the processing of B-stage papers, overlay papers, or decor papers.

The process results in a semi-finished product, comprising a textile structure, a B-stage binder composition according to the present invention in a B-Stage state, and optionally functional materials. The semi-finished product can be used for the manufacturing of laminates of all kind, in particular as reinforcement in laminates or as components of CPL or HPL.

Semi Finished Product

Further subject matter of the present invention is thus a semi-finished product comprising at least one textile structure comprising at least one binder composition comprising (i) at least one B-stage binder and (ii) at least one emulsion, preferably a thermoplastic emulsion, in particular the emulsion is being based on polyolefin and/or polyurethane, which is at least partially cured and being in the B-stage state, and wherein the textile structure has optionally an additional strengthening, and optionally functional materials.

Thus, subject matter of the present invention is a semi-finished product comprising a) at least one textile structure, and b) at least one binder composition comprising (i) at least one B-stage binder and (ii) at least one emulsion, preferably a thermoplastic emulsion, in particular the emulsion is being based on polyolefin and/or polyurethane, which is at least partially cured and being in the B-stage state, and wherein the textile structure has optionally an additional strengthening, c) Optionally functional materials.

The additional strengthening of the textile surface structure has already been described above. The same applies to the optionally applied functional materials. When using the inline process the additional strengthening can be small or even not existing. The textile structure is preferably a nonwoven, woven, or paper, as explained earlier. Papers are preferably overlay papers or décor papers.

Decorative Semi-Finished Product

Furthermore, the invention also comprises decorative semifinished products, in particular CPL and HPL, comprising:
a) at least one textile structure, preferably a non-woven fabric, and
b) at least one binder composition comprising (i) at least one B-stage binder and (ii) at least one emulsion, preferably a thermoplastic emulsion, in particular the emulsion is being based on polyolefin and/or polyurethane, which is at least partially cured and being in the B-stage state, and wherein the textile structure has optionally an additional strengthening, and
c) at least one decorative layer, preferably a layer or pattern of veneers, cork, decorative papers, foils with wood graining, overlay papers, HPL, CPL (laminates built up in multilayers) or chips of paper or plastic with different colors.

CPL and HPL typically consist of several, usually 2-50 layers of Kraft paper that are impregnated with a melamine, MUF or phenol B-stage binder. In as far as these CPLs and/or HPLs comprise at least one non-woven fabric containing B-stage binder composition in the B-Stage, a significant reduction of the number of layers of Kraft paper up to a complete replacement of the paper layers can take place.

The use of a non-woven fabric comprising a B-stage binder composition in the B-stage reduces the number of layers of Kraft paper by at least one layer, but preferably by at least 50% of the layers of Kraft paper with otherwise identical properties of the laminate. The reduction of the amount of binder-impregnated Kraft paper allows an improvement of the fire classification, which can extend to the classification of "noncombustible".

The CPLs and/or HPLs in accordance with the invention preferably have between 1 and 25 layers of a non-woven fabric with a B-stage binder. In addition, the CPLs and/or HPLs in accordance with the invention can have even more layers of Kraft paper impregnated with a melamine-formaldehyde, melamine-urea-formaldehyde or phenol-formaldehyge resin.

As mentioned above the textile structure of the semi-finished products which comprises the B-stage binder composition in B-stage conditions can also be Kraft papers. Such CPLs or HPLs offer a greatly improved mechanical flexibility compared to standard CPL or HPL. The textile structures comprising the B-stage binder composition in B-Stage conditions can also be overlay papers, balance papers or decor papers. All such papers are particularly beneficial when used as core papers and/or surface paper in CPL and HPL. In this case, a reduction of layers might not take place, but the resulting CPL or HPL shows improved flexibility and post-forming characteristics, in particular 3-dimensional forming capabilities. CPL or HPL can also comprise veneer layers.

The manufacture of the decorative semifinished product takes place by lamination under the action of pressure and heat in such a manner that the binder present in the B stage is partially or finally hardened. The lamination can takes place by discontinuous or continuous pressing or by rolling. The parameters of pressure, temperature and dwell time are selected in accordance with the B-stage binder used.

The semi-finished products according to the present invention exhibit a significant increase in flexibility and mechanical bending capabilities. The improved flexibility and mechanical bending capabilities can be measured as impact behavior in accordance with DIN EN 14323, DIN EN 13329 and DIN EN 438 part 1 to part 6.

The flexibility can be measured using a Standard Werzalit analysator available from Werzalit. The measurements are carried out under standard conditions (160° C.).

The binder composition according to the instant invention provides a very good flexibility of the textile structure when applied. The flexibility provided is at least 20%, preferably at least 25%, in particular at least 30%, most preferred 35% when applied to a glass fiber nonwoven having an area weight of 160 grams/square meter (StabilStrand☐☐EW160 C nonwoven available from Johns Manville Sales GmbH, Bobingen, Germany); 105 g/m$^2$ of B-Stage binder (melamine-formaldehyde B-Stage binder) with 1% thermoplastic emulsion (polyolefin, polypropylene DSM Nx777).

State of the art products are often brittle making the handling difficult and troublesome. The new product minimizes these problems. In addition, the generation of dust that almost always occurs during manufacturing and during the subsequent process steps can be greatly reduced or even totally suppressed. When using the inventive semi-finished products for the manufacture of laminates these laminates exhibit a superior mechanical flexibility and bending behavior compared to standard products.

The new B-stage binder composition in the textile structure strongly improves the compatibility to additives and functional materials allowing the use of a broader range of materials. In addition, the new B-stage binder composition increases the compatibility to the carrier materials, such as to WPC (wood plastic composites), plastics and metals.

Laminates and Composites

Subject matter of the present invention are also laminates and composites comprising at least one textile structure utilizing the new binder composition comprising (i) at least one B-stage binder and (ii) at least one emulsion, preferably a thermoplastic emulsion, in particular the emulsion is being based on polyolefin and/or polyurethane, and the method for the manufacture of such laminates/composites.

As mentioned above the textile structures are preferably nonwoven, woven fabrics, or papers.

Laminates consists of several layers of different materials and/or structures which are laminated under the action of pressure and heat. When using textile structures comprising binder in B-stage the binder receives its final hardening.

Composites and laminates are well known in the art. Composites and laminates have been utilized in many application fields because the possibility to use different materials and layer structures offers a large variety of different product properties.

Method of Manufacturing Composites

Subject matter of the present invention is a method for the manufacture of a composite material comprising the measures:
a) Supplying of a carrier,
b) Application of a textile structure onto at least one surface of the carrier, the textile structure having at least one binder composition comprising (i) at least one B-stage binder and (ii) at least one emulsion, preferably a thermoplastic emulsion, in particular the emulsion is being based on polyolefin and/or polyurethane, which is at least partially cured and being in the B-stage state, and wherein the textile structure has optionally an additional strengthening, and optionally at least one functional material, c) Lamination of the construction obtained according to step b) under the action of pressure and heat so that the binder present in the B stage receives its final hardening,
d) Optional application of at least one further protective layer and drying.

The carrier used in accordance with step a) is preferably wooden materials like engineered wood, papers, cork, cardboards, mineral plates, wood-plastic-composites and/or so-called honeycombs. Honeycombs are structural components with three-dimensional reinforcement structures that make possible an extraordinary stability and strength with low weight at the same time on account of their construction (bee honeycomb structure). Such honeycombs have been used for some time in many areas of application, among others also as inner reinforcement of plate-shaped elements in the construction area or in furniture.

Wooden Carrier

The wooden materials are plate-shaped or strand-shaped wooden materials manufactured by mixing the different wooden particle forms with natural and/or synthetic binding agents during a hot pressing. The wooden materials used in accordance with the invention preferably comprise plywood or laminated wood, wood-chip material, especially chipboards and OSB (Oriented Strand Boards), wood fiber material, especially porous wood fiber boards, open-diffusion wood fiber boards, hard (high-density) wood fiber boards (HDF) and medium-density wood fiber boards (MDF), and Arboform. Arboform is a thermoplastically workable material of lignin and other wood components.

Papers and Cardboards

The papers are preferably papers on the basis of natural, synthetic, mineral or ceramic fibers or also of mixtures of these fiber types.

The cardboards are preferably cardboards on the basis of natural and/or synthetic fibers, which also comprise mineral and/or ceramic fibers as well as mixtures of these fiber types.

Mineral Plates

The mineral plates are preferably commercial mineral cardboard plates with cardboard coating on both sides, gypsum fiber plates, ceramic fiber plates, cement plates or lime plates. The plates can optionally be reinforced with natural and/or synthetic fibers, wherein these can also comprise mineral and/or ceramic fibers. The reinforcement fibers can be present in the form of filaments, monofilaments or as staple fibers.

In addition to the described materials the carrier can also consist of cork, veneer or other sustainable vegetable materials.

The carrier can also be a WPC (wood-plastic-composite), a foam or other plastic sheet materials. In the case of foam, the material needs to have enough strength to withstand the pressure during the laminating process.

The weight per unit area of the carriers contained in the composite material is a function of the final application and is not subject to any particular limitation.

The lamination of the construction obtained according to step b) takes place in step c) under the action of pressure and heat in such a manner that the binder present in the B stage receives its final hardening. The lamination can take place by discontinuous or continuous pressing or by rolling. The parameters of pressure, temperature and dwell time are selected in accordance with the B-stage binder used.

The application of at least one further protective layer and its drying in accordance with step d) takes place by known pressure, spraying and lacquering technologies. The application can also take place here by rotary nozzle heads. The drying of the protective layer takes place as a function of the selected system.

The protective layers are usually lacquers such as powdered lacquers, clear lacquers or transparent lacquers, preferably scratch-proof lacquers that protect the functional layer against mechanical influences or against UV ageing.

Method of Manufacturing Composites (Variant)

In a variant of the method in accordance with the invention in measure b) the textile structure can be applied with only at least one B-stage binder composition in the B-Stage state and the providing with at least one functional material can take place in a step after measure b). Such a method—also comprised by the present invention—comprises the measures:

I) Supplying of a carrier,
II) Application of the textile structure on at least one surface of the carrier, the textile structure having at least one binder composition comprising (i) at least one B-stage binder and (ii) at least one emulsion, preferably a thermoplastic emulsion, in particular the emulsion is being based on polyolefin and/or polyurethane, which is at least partially cured and being in the B-stage state, and wherein the textile structure has optionally an additional strengthening,
III) Optional lamination of the construction obtained according to step II) under the action of pressure and heat so that the binder present in the B stage partially or completely hardens,
IV) Application of at least one functional material on the side of the textile structure facing away from the carrier,
V) lamination of the construction obtained according to step IV) under the action of pressure and heat so that the binder present in the B stage receives its final hardening,
VI) Optional application of at least one further protective layer and drying.

The measures I), V) and VI) are identical with the initially cited measures a), c) and d).

The application of the textile structure containing at least one binder in the B-stage state takes place according to step II) as initially described under measure b), wherein the functional material is not present.

The lamination according to measure III) and VI) takes place under the action of pressure and heat in such a manner that the binder present in the B stage receives its partial higher or final hardening. The lamination can take place by discontinuous or continuous pressing or by rolling. The parameters of pressure, temperature and dwell time are selected in accordance with the B-stage binder used.

Composite Material

In addition to the above-described methods, further subject matter of the present invention is a composite material comprising:

a) A carrier,
b) At least one textile structure applied onto at least one of the two sides of the carrier which textile structure comprises at least one finally hardened B-stage binder composition obtained from a binder composition comprising (i) at least one B-stage binder and (ii) at least one thermoplastic emulsion, preferably the emulsion being based on polyolefin and/or polyurethane, said textile structure optionally being additionally strengthened, and
c) Optionally at least one functional material applied on the top of the textile structure provided with the B-stage binder composition or introduced into the textile structure comprising the binder composition,
d) Optionally further protective layers applied on the functional material.

Variations and modifications of the method in accordance with the invention are possible by using selected textile structures. Textile structures are preferably nonwoven, woven fabrics, or papers.

The textile structures which comprise the at least one finally hardened B-stage binder composition can have an additional strengthening as described above. In particular when following the offline process route the textile structures comprise an additional strengthening. The additional strengthening of the textile structure has already been described above. The same applies to the carrier, the B-stage binder, the functional material and the protective layers.

Composite Material with CPL/HPL as Functional Material

Furthermore, the invention also comprises a composite material in which the functional material applied is a decorative product, in particular CPL and HPL.

In addition to the above-described methods, further subject matter of the present invention is a composite material comprising:
a) A carrier,
b) At least one textile structure applied onto at least one of the two sides of the carrier which textile structure comprises at least one finally hardened B-stage binder composition obtained from a binder composition comprising (i) at least one B-stage binder and (ii) at least one thermoplastic emulsion, preferably the emulsion being based on polyolefin and/or polyurethane, said textile structure optionally being additionally strengthened, and
c) at least one functional material applied on the top of the textile structure provided with the B-stage binder composition or introduced into the textile structure comprising the binder composition, said functional material being at least one decorative layer, preferably a layer or pattern of veneers, cork, decorative papers, foils with wood graining, overlay papers, HPL, CPL (laminates built up in multilayers) or chips of paper or plastic with different colors,
d) Optionally further protective layers applied on the functional material.

Variations and modifications of the method in accordance with the invention are possible by using selected textile structures. Textile structures are preferably nonwoven, woven fabrics, or papers.

The textile structures which comprise the at least one finally hardened B-stage binder composition can have an additional strengthening as described above. In particular when following the offline process route the textile structures comprise an additional strengthening. The additional strengthening of the textile structure has already been described above. The same applies to the carrier, the B-stage binder, the functional material and the protective layers.

The manufacture of the decorative finished product takes place by lamination under the action of pressure and heat in such a manner that the binder present in the B stage is finally hardened. The lamination can takes place by discontinuous or continuous pressing or by rolling. The parameters of pressure, temperature and dwell time are selected in accordance with the B-stage binder used.

CPL/HPL Decorative Laminates

As mentioned above the manufacture of the decorative semifinished product takes place by lamination under the action of pressure and heat in such a manner that the binder present in the B stage is partially or finally hardened. The lamination can takes place by discontinuous or continuous pressing or by rolling.

Therefore, finally hardened decorative multilayer products, such like HPL or CPL, comprising at least one textile structure which comprises at least one finally hardened B-stage binder composition obtained from a binder composition comprising (i) at least one B-stage binder and (ii) at least one thermoplastic emulsion, preferably the emulsion being based on polyolefin and/or polyurethane, are also subject matter of the present invention.

The parameters of pressure, temperature and dwell time are selected in accordance with the B-stage binder used.

The manufacture of the decorative finished product takes place by lamination under the action of pressure and heat in such a manner that the binder present in the B stage is finally hardened. The lamination can takes place by discontinuous or continuous pressing or by rolling. The parameters of pressure, temperature and dwell time are selected in accordance with the B-stage binder used.

The finished products including the decorative finished products which comprises the finally hardened B-stage binder composition exhibit improved post-forming capabilities, in particular if used for narrow radii or edges.

CPL/HPL Decorative Composites

Composite materials comprising HPL or CPL comprising at least one textile structure which comprises at least one finally hardened B-stage binder composition are also subject matter of the invention.

Therefore, in addition to the above-described composite material, further subject matter of the present invention is a laminate comprising:
a) A carrier,
b) At least one CPL or HPL layer applied onto at least one of the two sides of the carrier which CPL or HPL comprises at least one textile structure comprising at least one finally hardened B-stage binder composition obtained from a binder composition comprising (i) at least one B-stage binder and (ii) at least one thermoplastic emulsion, preferably the emulsion being based on polyolefin and/or polyurethane, said textile structure optionally being additionally strengthened, and
c) Optionally further protective layers applied on the functional material.

The carrier and the CPL or HPL layer are laminated by using standard glues or binding means compatible to the materials used. The lamination process and its parameters are selected in accordance with the materials used.

As explained before, CPL and HPL typically consist of several, usually 2-50 layers of Kraft paper that are impregnated with a melamine-formaldehyde, melamine-urea-formaldehyde, or phenol-formaldehyde resind. In as far as these CPLs and/or HPLs comprise at least one non-woven fabric containing B-stage binder composition, a significant reduction of the number of layers of Kraft paper up to a complete replacement of the paper layers can take place.

The use of a non-woven fabric comprising a B-stage binder composition reduces the number of layers of Kraft paper by at least one layer, but preferably by at least 50% of the layers of Kraft paper with otherwise identical or improved properties of the laminate. The reduction of the amount of binder-impregnated Kraft paper allows an improvement of the fire classification, which can extend to the classification of "noncombustible".

As mentioned above the textile structures of the decorative finished products which comprises the finally hardened B-stage binder composition can also be Kraft papers. Such CPLs or HPLs offer a greatly improved mechanical flexibility compared to standard CPL or HPL based on standard resin compositions. The textile structures comprising the B-stage binder composition can also be overlay papers, balance papers or decor papers. All such papers are particularly beneficial when used as core papers and/or surface paper in CPL and HPL (no reduction of layers in case of paper).

The previously cited materials are suitable as carrier, textile structure, B-stage binder, functional material and protective layer. The preferred embodiments disclosed in the scope of the method in accordance with the invention also apply to the composite material of the invention.

The previously cited functional material can be present in the form of an independent layer applied in the B-stage on the side of the textile structure facing away from the carrier or can also entirely or partially penetrate the textile structure. These embodiments are suitable for functional materials such as flame proofing agents, materials for discharging electrostatic charges, materials for screening off electromagnetic charges, materials for screening off electromagnetic rays, organic or inorganic pigments, especially colored pigments or decorative layers.

In a preferred embodiment the functional material forms a discrete layer in the composite material of the invention. This embodiment is especially suitable for functional materials that increase the resistance to wear and/or slippage and/or increase the value by the optical effect of the surface. It is especially advantageous if the functional material is to make anti-slippage material or an increased resistance to wear if the basic particles project at least partially from the textile structure provided with the B-stage binder.

The functional material is present in the carrier and/or on the side of the textile structure facing away from the carrier.

The composite material in accordance with the invention makes possible a direct workability for the subsequent applications since the composite material already contains the necessary provisioning with functional material.

The inventive laminates and composites exhibit a superior mechanical flexibility and bending behavior compared to standard products. In addition the impact resistance is greatly increased making these new products extremely suitable for mechanically challenging environments.

The strongly increased mechanical performance of the inventive composite materials, in particular composites comprising wooden material such as engineered wood, offer additional advantages. Due to the unique combination of flexibilty and mechanical strength of the novel binder containing textile structures certain mechanical treatments like nailing, screwing, drilling or any other application of punctual force are possible without damaging the composite or surface layers. Typically cracks, bursts, and other damages occur if composites comprising different materials are treated with nails etc. The inventive binder avoids these kind of problems offering great advantages for the furniture industry and construction industry, e.g when used in concrete forms.

As already mentioned above due to the addition of thermoplastic emulsions, the compatibility and therefore the mechanical properties of the final composites can be improved. The emulsion can act as a coupling agent between a carrier with non-compatible characteristics to the B-stage binder and the laminated layer.

In decorative laminates it is quite common to add 3-dimensional structures to the laminate using e.g. a structured press plates. This kind of treatment usually reduces the impact performance. The inventive binder composition allows an improved impact performance also for such structured laminates.

EXAMPLES

Example 1

A laminate was produced comprising a balance paper, a particle board, a glass fiber nonwoven layer, a decor paper, and an overlay paper. The balance paper was a standard type with 140 g/m² specific weight. The particle board was a standard particle board according to P2 norm with a density of 650 kg/m³ and thickness of 17 mm. The glass fiber nonwoven was a StabilStrand□□EW160 C nonwoven produced by Johns Manville Sales GmbH, Bobingen, Germany.

This nonwoven comprises 105 g/m² of a melamine-formaldehyde B-Stage binder. The décor paper is a standard furniture paper of 50 g/m² weight comprising 160 g/m² of a melamine-formaldehyde B-stage binder.

The overlay paper is a standard AC3 paper with 22 g/m² weight and 78 g/m² standard binder.

The laminate was manufactures on a short-cycle-press laminated at 200° C. and 25 bar for 25 sec.

The impact behavior was measured according to DIN EN14323, DIN EN 13329, and DIN EN438 part 1-6. The results are listed in table 1.

Example 2

A laminate was produced with the same structure and under the same conditions like in Example 1. However, the overlay paper comprises the inventive binder composition. The binder composition was a melamine-formaldehyde binder modified with 1% PP emulsion DSM Nx777. The results are listed in table 1.

Examples 3-7

Glass fiber nonwoven samples were produced based on StabilStrand□□EW160 C nonwoven produced by Johns Manville Sales GmbH, Bobingen, Germany. 105 g/m² of a melamine-formaldehyde B-stage binder compositions were added to the samples with different emulsion contents.

Example 3 was made with a melamine-formaldehyde B-stage binder without any emulsion modifications. The data and results are listed in table 2.

The flexibility of the nonwoven was determined by using a Werzalit analysator which is well known and widely used in the field. This method allows the determination of the sample flexibilty by measuring the dynamic cure and flow times of the resins in the sample.

TABLE 1

(impact testing)

| Sample | Force (small ball) | Distance (large ball) |
|---|---|---|
| Example 1 | 13N | 50 cm |
| Example 2 | 16N | 150 cm |

TABLE 2

(flexibility testing)

| Sample | Cure time (min) | flow (sec) | Flexibility (%) |
|---|---|---|---|
| Example 3 | 0.2 | 10 | 16 |
| 1% PP (DSM Nx777) | 0.3 | 12 | 36 |

TABLE 2-continued (flexibility testing)

| Sample | Cure time (min) | flow (sec) | Flexibility (%) |
|---|---|---|---|
| 2% PP (DSM Nx777) | 0.4 | 14 | 46 |
| 5% PP (DSM Nx777) | 0.6 | 19 | 50 |
| 5% PP (AC Priex 703) | 0.5 | 17 | 39 |

The invention claimed is:

1. A binder composition comprising:
a B-stage binder, wherein the B-stage binder comprises a formaldehyde-free thermoset binder;
a foaming agent; and
a thermoplastic emulsion.

2. The binder composition of claim 1, wherein the thermoplastic emulsion is 0.1 wt. % to 35 wt. % of the binder composition.

3. The binder composition of claim 1, wherein the thermoplastic emulsion comprises thermoplastic polyethylene or thermoplastic polypropylene.

4. The binder composition of claim 1, wherein the foaming agent is 1 wt. % to 5 wt. % of the binder composition.

5. The binder composition of claim 1, wherein the foaming agent comprises an ammonium stearate or a succinic acid ester.

6. The binder composition of claim 1, wherein the binder composition further comprises a hardening catalyst.

7. The binder composition of claim 1, wherein the binder composition is formaldehyde-free.

8. A textile structure comprising:
a textile fabric comprising fibers; and
a B-staged binder, wherein the B-stage binder comprises:
a formaldehyde-free thermoset binder;
a foaming agent; and
a thermoplastic emulsion.

9. The textile structure of claim 8, wherein the fibers include at least one fiber selected from the group consisting of mineral fibers, ceramic fibers, natural fibers, polymer fibers, and glass fibers.

10. The textile structure of claim 8, wherein the textile fabric comprises a non-woven textile fabric of the fibers.

11. The textile structure of claim 8, wherein the textile structure further comprises a pre-strengthening binder.

12. The textile structure of claim 11, wherein the pre-strengthening binder is 10 wt. % to 30 wt. % of the textile structure.

13. The textile structure of claim 8, wherein the thermoplastic emulsion is 0.1 wt. % to 35 wt. % of the B-stage binder.

14. The textile structure of claim 8, wherein the thermoplastic emulsion comprises thermoplastic polyethylene or thermoplastic polypropylene.

15. A composite material comprising:
a textile structure; and
a carrier material,
wherein the textile structure comprises:
a textile fabric comprising fibers; and
a B-staged binder comprising:
a formaldehyde-free thermoset binder;
a foaming agent; and
a thermoplastic emulsion.

16. The composite material of claim 15, wherein the textile fabric comprises a non-woven textile fabric of the fibers.

17. The composite material of claim 15, wherein the carrier material includes at least one carrier material selected from the group consisting of wood, engineered wood, paper, cork, cardboard, mineral plates, wood-plastic composites, and honeycombs.

18. The composite material of claim 15, wherein the textile structure is laminated on the carrier material.

19. The composite material of claim 15, wherein the thermoplastic emulsion is 0.1 wt. % to 35 wt. % of the B-stage binder.

20. The composite material of claim 15, wherein the thermoplastic emulsion comprises thermoplastic polyethylene or thermoplastic polypropylene.

* * * * *